United States Patent [19]

Ware

[11] Patent Number: 4,707,592

[45] Date of Patent: Nov. 17, 1987

[54] PERSONAL UNIVERSAL IDENTITY CARD SYSTEM FOR FAILSAFE INTERACTIVE FINANCIAL TRANSACTIONS

[76] Inventor: Paul N. Ware, P.O. Box 509, Summerville, Fla. 30747-0509

[21] Appl. No.: 784,954

[22] Filed: Oct. 7, 1985

[51] Int. Cl.⁴ .............................................. G06F 15/30
[52] U.S. Cl. ..................................... 235/379; 235/380
[58] Field of Search ................................. 235/379, 380

[56] References Cited

U.S. PATENT DOCUMENTS

| | | | |
|---|---|---|---|
| 3,597,734 | 8/1971 | Harris, Jr. ............................ | 340/149 |
| 3,636,315 | 1/1972 | Comeau ............................... | 235/380 |
| 3,702,392 | 11/1972 | St. Jean ................................ | 235/380 |
| 3,718,764 | 2/1973 | Deschenes et al. ............... | 179/2 DP |
| 3,719,927 | 3/1973 | Michels et al. ................... | 340/149 R |
| 3,731,076 | 5/1973 | Nagata et al. ..................... | 235/380 |
| 4,048,475 | 9/1977 | Yoshida ............................. | 235/380 |
| 4,300,042 | 11/1981 | Oldenkamp et al. ............. | 235/449 |
| 4,423,316 | 12/1983 | Sano .................................. | 235/379 |

*Primary Examiner*—Harold I. Pitts
*Attorney, Agent, or Firm*—Oltman and Flynn

[57] ABSTRACT

A financial card transaction system for protecting the financial transactions against fraud, by reducing the dissemination of the cardholder's account code and the transaction data. The system includes a plurality of retail sales, each having a card reader that is connected by data channels to a transaction center with a computer that includes cardholder's records and a transaction number generator. The transaction number uniquely identifies each transaction undertaken within a given time frame and is the only number printed out on a transaction ticket at the retail site, while transaction data, such as cost, type of merchandise, cardholder's account number, etc. are not printed out at the retail site, but only at the transaction center where it is included in the monthly or quarterly statement printed by the computer and sent to both cardholder and retail site. Encryption may be included in order to prevent the unauthorized monitoring of the data flow. A telephone interface may be provided at the retail site so that a cardholder may call and send his account number and personal identity number from a push button telephone.

26 Claims, 14 Drawing Figures

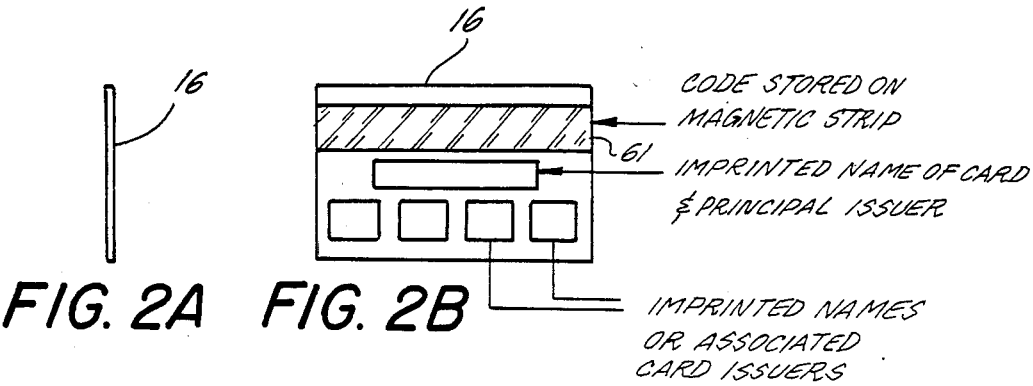
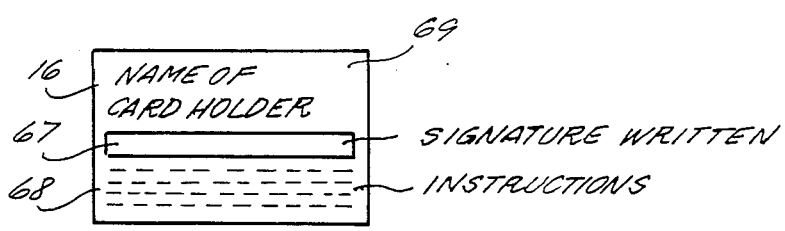
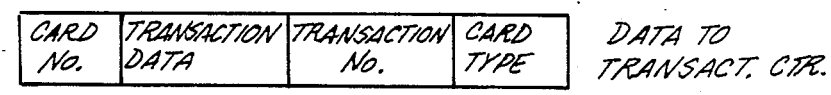

PERSONAL UNIVERSAL IDENTITY CARD SYSTEM FOR FAILSAFE INTERACTIVE FINANCIAL TRANSACTIONS

BACKGROUND OF THE INVENTION

The invention relates to secure identity card systems, and more particularly, to a failsafe interactive, universal financial transaction system, requiring only one common card.

It is well known that credit card frauds are commonly perpetrated with the existing widely used credit card system, wherein a credit card user has in his possession a small plastic card on which his account number or code with the card issuing organization is printed on the card in raised numerals and letters. This card is constructed to be inserted into a simple, small card reader with a multilayer transaction paper blank with carbon paper between the layers of the blank layers from which several copies of the transaction are made. All the copies have imprinted on them the cardholder's name and account number and other transaction data, such as the monetary amount of the transaction, data and so forth, and he is given one copy as proof of the transaction and its data, while the retail establishment retains several copies, of which one is kept for the record, another one is sent to the card-issuing organization for reimbursing the retail establishment, and there may be other copies. The used carbon papers are discarded. The used carbon papers have on them a clearly visible reversed facsimile of the transaction, including the customer's name, his account number and details of the transaction. The carbon papers are often literally thrown to the wind as they are dumped into the trash receptacles at day's end. Individuals who are intent upon defrauding the system are known to collect and use these carbon papers to reconstruct a customer's name and account number for making false cards, and for filing fraudulent claims or fraudulently obtaining merchandise and services at the expense of the system.

Another problem that is characteristic of the system that is now in use is the proliferation of different types of credit cards that are in use. Typically, a person who travels and entertains to a considerable degree may find it necessary to carry as many as ten or more different credit cards on his person. Clearly, that many credit cards in circulation increases the probability of accidentally losing cards, the need for reporting their loss and cancelling and voiding them. Time used in processing lost cards can be considerable.

PRIOR ART

Inventors have in the past sought to overcome the problems relating to misuse of credit card identification cards.

U.S. Pat. No. 4,300,042 shows a method of registering selected magnetic data on magnetic stripe cards.

U.S. Pat. No.4,048,475 shows an apparatus for checking the user of a card in card-actuated machines by means of two kinds of coded information.

U.S. Pat. No. 3,718,764 shows a terminal unit for maintaining up-to-date records of credit accounts at a central station.

U.S. Pat. No. 3,731,076 shows a system for preventing improper use of credit cards by means of a correspondence between the number on the card and data manually entered by a user.

U.S. Pat. No. 3,719,927 shows a credit control system which requires positive authorization of each purchase from a central file.

U.S. Pat. No. 3,702,392 shows a method of identifying the identity of a cardholder by means of a security code assigned to each cardholder.

U.S. Pat. No. 3,636,315 shows a guest identification apparatus and method for hotel use, by means of a special identity.

U.S. Pat. No. 3,597,734 shows a system for authenticating credit cards wherein the card contains a hidden code by means of irregularities in the card surface.

SUMMARY OF THE INVENTION

The instant patent application discloses a multipurpose credit and identity card system that provides security against fraudulent or unauthorized use of cards by means of a system that avoids the use of paper with information that can be misused at the place of the transaction, or subsequently be misused, yet provides the retail customer with a transaction receipt for preventing loss of records, and avoids the need for carrying numerous individual separate credit identity cards with attendant recordkeeping.

In its most basic form of the invention, a card user has one card that does not necessarily show externally in plain letters or numerals the account number or ID information of the cardholder with the card ID issuing corporation or corporations or other entities, but only the name of the cardholder and of the card-issuing organization. In cases wherein the card may be used as a driver's license or a government ID card, there may optionally be additional information shown on the card. The card has a possibly invisible but machine-readable stripe that contains in magnetic or any other suitable type of encoding such as laser imprinting, bar code or an imbedded memory chip, or a card-code that may be combined with a user supplied personal code not present on the card in order to verify the card-carrying person's account or identity. A transaction terminal provided at the retail or transaction site has a slot or space for receiving the card and means for reading the encoded card code and a keyboard on which the user enters his personal code or authorized code made available to family members or the like. The transaction terminal located at the retail or transaction site is connected by a telephone or data link (hook-up) to a central transaction center with a computer with a financial or a data file and a program for receiving the card code and the personal code and other transaction information, and combining the two codes to form a file access address for access to the card user's records in the file. If the records indicate that the user's account is in good standing, The transaction center will return to the transaction terminal a validation signal and a cumulative transaction number, and record and store the details of the transaction at the transaction center in the center computer's memory. The transaction number is a number that is cumulatively incremented for each transaction at the center, advantageously for each day and is incremented by one or several units for each completed transaction during the day. The data of the transaction and the transaction number is returned over the data link to the transaction terminal and is there printed out on a ticket at a printer connected to the terminal. The cardholder and the retail establishment each get a copy of the ticket, which optionally does not contain the data of the transaction, but only the merchant name and the date of the transaction, name and address of the card-issuing establishment and the transaction number. The cardholder's identity and account number may not necessarily be printed out. The transaction number and the date, together with the establishment name, uniquely identifies the transaction if the customer or retailer should have a need to trace the transaction at a later time.

At the transaction center, the computer converts the transaction to clear language and engages a printer which prints out a desired number of tickets that identify the transaction in all its details including cost, date, place, items purchased and so forth. One of these tickets is mailed from the center to the cardholder, one to the retail establishment and one to the card issuing organization. The card code is not printed on the ticket. In that way, a person's card code need only be known to the few people operating the transaction center and can readily be kept confidential and secure. Also, the personal ID code need only be known to a few people besides the cardholder.

In a further improved embodiment of the invention, the transaction terminal may contain a microprocessor with a program for encrypting the cardholder's card code and his personal ID code, so that a number or code transmitted over the telephone line, if intercepted by unauthorized individuals, cannot be broken down in order to surreptitiously retrieve the cardholder's account number and personal identification number. At the transaction center, the encrypted code is again deciphered by the central computer.

The cumulative transaction number that is issued by the transaction center need not be a clearly incremented number, which could be used to surreptitiously deduce certain details about the transaction. That number may advantageously also be encrypted so that unauthorized persons cannot deduce any clues as to the specifics of any of the transactions.

The system, according to the invention, which is based on the existence of a central transaction center, lends itself very well to be used as a universal transaction center that can serve any or all card-issuing organizations for credit or identify verification purposes, in the following called associate card organizations. In this way, the ID card could serve, as desired, as e.g. a Master Card, a Visa Card or gasoline charge card, a driver's license, medical, insurance card, organ donor, and so forth, if the user enters the name, a code or acronym for each of the participating associate card organizations. These names, acronyms or codes may advantageously, selectively be imprinted on the card to aid the user in executing the transaction.

It is accordingly the object of the invention to provide an ID/credit card system that is secure in that no readily identifiable data are required to be printed at the transaction site for unauthorized, later use.

It is another object of the invention to provide a card system that is secure in that each transaction is identified by a unique cumulative transaction number that is imprinted on the cardholder's receipt at the transaction site for each transaction. This allows the card user to control the card's use. Voided cards and unassigned and invalidly numbered cards are readily spotted at the transaction center and cancelled.

It is another object to provide a card system wherein a transaction terminal at the transaction site interactively communicates with a transaction center over data links by means of encrypted data that can be deciphered only by those who have the key to the code.

Encryption techniques are well known. A particularly well known encryption algorithm has been developed by the National Bureau of Standards and is known as the Data Encryption Standard (DES), which is in the public domain. More information is provided in Precise Encyclopedia of Science and Technology by McGraw Hill and others.

Further objects and advantages of this invention will be apparent from the following detailed description of presently preferred embodiments which are illustrated schematically in the accompanying drawings.

BRIEF DESCRIPTION OF THE DRAWINGS

FIGS. 2A, 2B and 2C show an edge view, a front view and a rear view, respectively of a typical card according to the invention.

FIGS. 7A-D show details of the transmitted data format.

Before explaining the disclosed embodiments of the present invention in detail it is to be understood that the invention is not limited in its application to the details of the particular arrangements shown, since the invention is capable of other embodiments. Also, the terminology used herein is for the purpose of description and not of limitation.

DESCRIPTION OF THE PREFERRED EMBODIMENTS

Figure 1A:
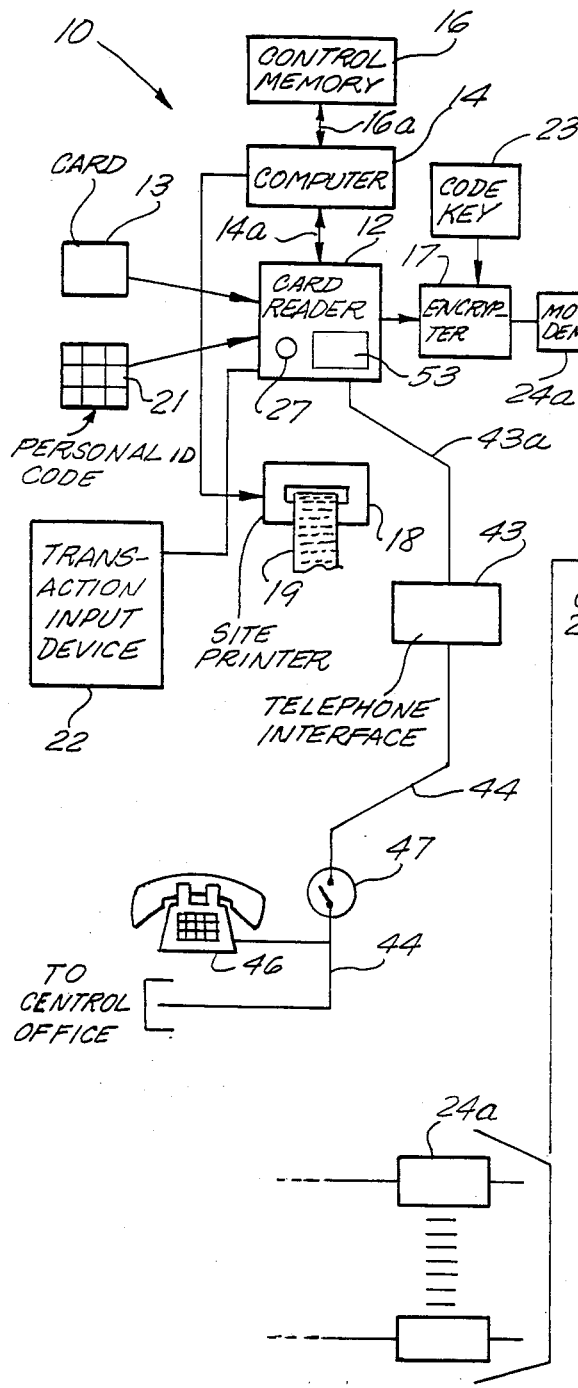
FIGS. 1a and 1b are block diagrams of the elements of the system according to the invention and their mutual cooperation, showing details of the transaction terminal at the transaction site and details of the transaction center.
Figure 1B:
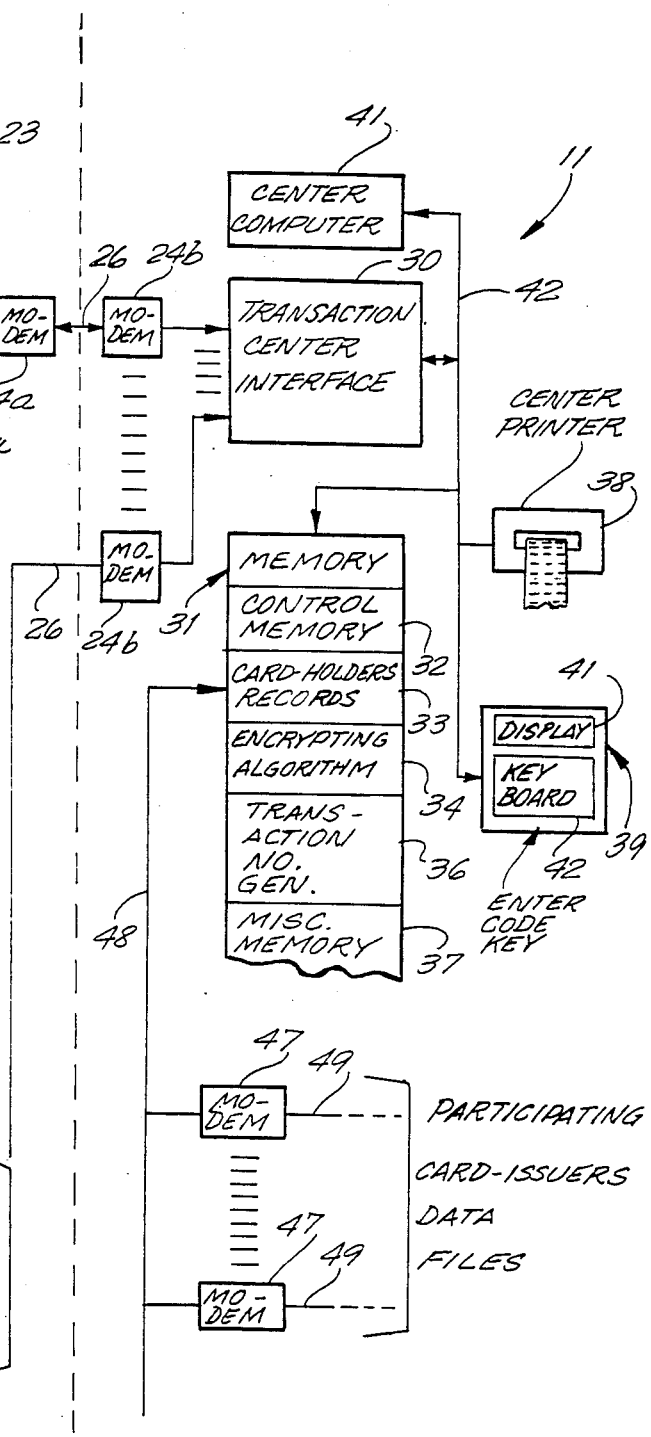

FIGS. 1A and 1B show a financial transaction system according to the invention. FIG. 1A is a transaction site part 10 of the system and FIG. 1B is the transaction center part 11 of the system. Typically one transaction center 11 cooperates with multiplicity of transaction sites. Only one transaction site is shown in detail in FIG. 1A since they are alike. The transaction site 10 includes a card reader 12, that is the central component of the transaction site apparatus to which the other components of the transaction site are connected. The card reader 12 serves to receive a card 13 in a suitable slot or receptacle, which is shown in more detail in FIG. 4A.

The card reader 12 contains components that are capable of receiving a card 13 of the proper format the card slot and reading a machine-readable code, imprinted by any suitable means, on the card 13, and electronic circuits for temporarily storing the card and personal code and for transmitting the code and other data via a modem 24 and a data link 26 to a modem 24 at the transaction center 11. The card reader 12 is further connected to a computer 14 which operates to control all the functions of the card reader 12 via a computer bus 14a, which is further connected with all other electronic circuits in the card reader 12, as explained in more detail hereinbelow.

The computer 14, which is typically a microcomputer of any suitable conventional type, such as an Intel 8080 or the like, is connected via the memory bus 16a to a control memory 16 which contains, stored in its memory, all the parts of a control program, that are required for controlling the microcomputer 14, which in turn controls the card reader 12. The computer 14 is also connected to a printer 18 for printing retail transaction data onto a paper ticket 19. The printer advantageously is of a conventional type that prints alphanumeric information on a tear-off paper strip or the like.

The card reader is further connected to a transaction input device 22 which, in the preferred embodiment, is a keyboard with optical display on which the transaction site operator can enter the transaction data, such as the value of the transaction, type of merchandise or service, date, merchant's code and so forth. It follows that the several parts of this information need not be manually keyed into the device for each transaction. The data, for example, can be set on suitable dials or switches that can be read electronically and which can be set at the beginning of each time period. The merchant's code is a number that uniquely identifies each merchant or retail or any other user site to which the transaction center is connected. It follows that the merchant's code may be inserted, on a semi-permanent basis, into the card reader, for example, by means of dials or so-called dipswitches that are well known and widely used for settling semipermanent information in electronic systems. Assigned operator codes for identification of employees, etc. may also be included in the merchant's code.

In the preferred embodiment, the card reader 12 is further connected to a personal identification number (PIN-number input device 21) which advantageously is a small numeric keyboard of the type well known from pushbutton telephones and the like. In this embodiment, a retail customer or a person to be identified, in order to complete a transaction, may have to enter a unique personal identity number (PIN), in order to be accepted by the computer in the transaction center. The PIN-number is normally memorized by the retail customer or person to be identified, and is keyed into the system on demand by the card reader, e.g. by a tone, voice or a light or mechanical signal 27 on the card reader 12.

Each transaction site 10 is advantageously, in still another embodiment, connected to the data link 26 and the modem 24 through an encrypter 17, which operates to convert all the data furnished by the card reader 12 into an encrypted data stream that is completely unreadable to anyone who does not possess the key to the encryption algorithm. A well known encryption algorithm is available from the U.S. National Bureau of Standards. The encrypter 17 is typically a small electronic device that performs the encryption conversion based on the chosen algorithm and the chosen key. Encryption of data per se is a well known art, and is described in more detail in reference books such as *McGraw-Hill Concise Encyclopedia of Science & Technology*, under cryptography, which states that the The Data Encryption Standard (DES) algorithm is in the public domain.

The DES enciphers a 64 bit block of plain text into a 64 bit block of ciphered text under control of a 56 bit key. DES was adopted by the National Bureau of Standard in 1975 as a standard encryption algorithm.

In the preferred embodiment the encrypter 17 is advantageously a small stand-alone microcomputer having a built-in program and a code key 23 which fits in a receptacle, for easy replacement, in the encrypter 17 and which contains the key code, that in turn is a string of alpha-numeric characters encoded onto the code key 23, e.g., as a small diode matrix or read-out memory, containing the key code.

After the data message, representing the details of the retail transaction, has passed through the encrypter 17, the message is converted into secret code which is converted as a string of alphanumeric characters, which is passed on to the modem 24a at the retail site. The modem 24a converts the character string into a form that is suitable for transmission over a data link, which may be a telephone line that may be switched or a direct dedicated data link of any suitable type. In case it is a switched line, a dialling device, such as a telephone instrument or the like must be connected to the telephone line in order to set up the connection; the dialling device is not shown. The dialling of the transaction center may alternatively be dialled automatically by the microcomputer 14 which may have a dialling program stored in the control memory 16. The two modems 24a and b, one at each end of the data line, are well known conventional devices. Each consists of a modulator that takes the incoming data stream in the form of binary code and modulates it into a form that is suitable for transmission over the line. There are many methods of modulation available, one of which is the so-called frequency-shift keying method in which a carrier frequency is transmitted in two frequencies representing the two states one and zero of the signal. The demodulator at the other end with this method of modulation contains a frequency shift detector that delivers the original data signal as a binary signal suitable for direct connection to the logic circuits used in both the card reader 12 at the retail site 10 and the circuits at the transaction center 11. A well suited modem is MC 6860 from Motorola Corporation which is described in great detail in that company's application notes.

At the transaction center, equipment is provided that operates to interact with each of the retail sites and receive the transaction data, including the card number, the PIN number from the keyboard 21 and the transaction data from the transaction input device 22. This data, which are sent as a data string over the data line 26, as described hereinabove, is first transmitted to a transaction center interface 30 that serves as an interface and buffer store between the center computer 41 and the data line 26 with modems 24. The center interface 30 serves to provide compatibility between the multiplicity of modems 24 to the retail sites 10 and the center computer 41 with its computer bus 42, and is described in more detail hereinbelow. The center computer 41 may be any suitable computer having sufficient computing capability, for handling the volume of transactions required by all the individual retail sites combined. A typical minicomputer of a type such as made by IBM or Digital Corporation, will do well to handle a typical volume of data transactions.

The center computer is connected to a computer memory 31 that contains memory sections that contain data and programs required to operate the transaction center, as described in more detail hereinbelow. Memory sections of particular importance is the control memory 32 which contains all the control programs that control the operation of the transaction center via the center computer 41 in accordance with the flow chart diagram shown in FIGS. 5 and 6.

The control programs stored in the control memory 32 consists of strings of binary encoded instructions that are read sequentially and executed by the computer 41. The format of the instructions depends on the internal construction of the computer 41. The method of development of the programs is a well known art that is described in text books, such as *Computer Organization and Programming* by William Gear published by McGraw-Hill or *Microcomputer-based Design* by John B. Peatman, also published by McGraw-Hill.

The memory 31 further includes a customer's cardholders file section, which contains all the pertinent financial information for each retail or identification cardholder and the so-called transaction records for every transaction for every card-holder belonging to the system. The financial information is typically a listing of all the transactions undertaken by the customers within a given time frame, and may include dates for the customer's payment of the outstanding balance and the current balance and credit limit at any given time and any other financial information required for operation of the system. The customer transaction record also includes the PIN number for each customer and the customer's account number, which may advantageously be the machine-readable code on the card. It follows that each card-holder's record may include any information that may be legally and advantageously stored therein.

The memory 31 further includes an optional reverse encryption algorithm program 34 that operates to decipher the data from the retail site in case the data have been encrypted by the encrypter 17.

The memory 31 further includes a transaction number generator program 36 that operates to produce a cumulative transaction number that is unique to each transaction, e.g., within a time frame of twenty-four hours or any other suitable time frame.

The transaction numbers may be non-sequential, since sequential numbering may possibly provide a clue to someone intent on defrauding the system, but, it follows they must be unique to each transaction within the given time frame.

The transaction number is transmitted in the reverse direction from the transaction center 11 to the transaction site for printing on the transaction site computer transaction ticket, of which the customer gets one and the retail center retains one, and the transaction number is also stored with the transaction record in the cardholder's records section 33.

A memory section 37 designated miscellaneous memory, serves to provide other functions and programs not included in the above described memory sections, which are required in the operation of the system and which perform functions that are conventional.

The transaction center further includes a center printer 38 that produces a complete transaction ticket for each transaction, that contains all the data related to a transaction, namely, the cardholder's name and address, his account number, the transaction number, the merchant's name and address, details of the purchase, such as cost, description of the merchandise or service, type and date of transaction and other information, if desired. One of the tickets is mailed to the customer, who will then have a complete record of the transaction who can use the transaction numbers to correlate the received ticket with the first but abbreviated ticket he received at the time and place of the transaction by means of the transaction number.

Another ticket, but without the cardholder's account number, may then be mailed to the merchant for his records.

It follows that the complete transaction ticket can be part of a monthly statement sent to each cardholder and each merchant, so that no extra postage is required, since each cardholder normally already receives a monthly statement.

In this way, the abbreviated transaction ticket issued at each transaction site, which contains only the barest minimum of information, advantageously only the merchants name and a transaction number and a contact telephone number for the transaction center, is not providing information that can be used by personnel or individuals who may get access to the ticket and use it to defraud the system. As an example, there need not be a cardholder's name and account number present at a retail site for each transaction by every salesperson, as with the presently known card systems.

The card system, according to the invention, has the further advantage that each cardholder who has made a card purchase, and who has a complaint about the purchase can call the transaction site or the transaction center. A person at the transaction center can go to a console 39, with a display 41 and a keyboard 42 and by means of the transaction number access the customer's files 33, and have the entire transaction displayed on the display screen 41 and steps can then be taken to make adjustments or explain misunderstandings or attend to whatever cause for concern the cardholder may have.

In a further development of the system described hereinabove, it is possible for a cardholder to make a purchase charged to his credit card directly from a telephone with a touch tone keypad (Touch Tone is an AT&T registered trademark) without jeopardizing the integrity of his card number, as happens with the present system. Presently, when a person makes a credit card purchase over the phone, the person must verbally present his name and card number over the phone. Oftentimes, the card number and name gets to the wrong person who may misuse it to order unwanted merchandise.

With the system according to the invention, a merchant at the retail site 10 who wishes to take an order over the telephone line 44 can have a customer, at the other end of the telephone connection, who has a touchtone telephone, tap in his account number and PIN number which then is entered directly into the card reader 12 via a telephone interface 43, a manual switch 47 for switching the telephone line 44 to the telephone interface 43. In this case, there is no written record of the transaction site of the cardholder's account number, and the transaction proceeds exactly as if the card had been inserted manually into the card reader. It is therefore not necessary that the card number be shown visually on the card, since the cardholder can read that number from a sheet of paper and he need not read it from a card as is now customary.

In a further embodiment of the system, the computer 41 at the transaction center 11 may have access to other data centers via modems 47. These data centers may be computers with memories that contain additional information about the cardholders belonging to various card-issuing organizations. Such information may be credit limits, card account balance, credit status, such as stolen or lost cards, credit hold, driver's license status, medical records, insurance, organ donors, and so on.

Typically, each of those data centers would represent the cardholder files for participating card issuers.

It follows that the card connections to the participating card issuers could be two-way data connections, so that each participating card issuer would maintain its own customer's files and send its own manual statements to its own cardholders.

Alternatively the card-issuer and the cardholders may agree on issuing consolidated common statements to each customer.

Figure 4A:
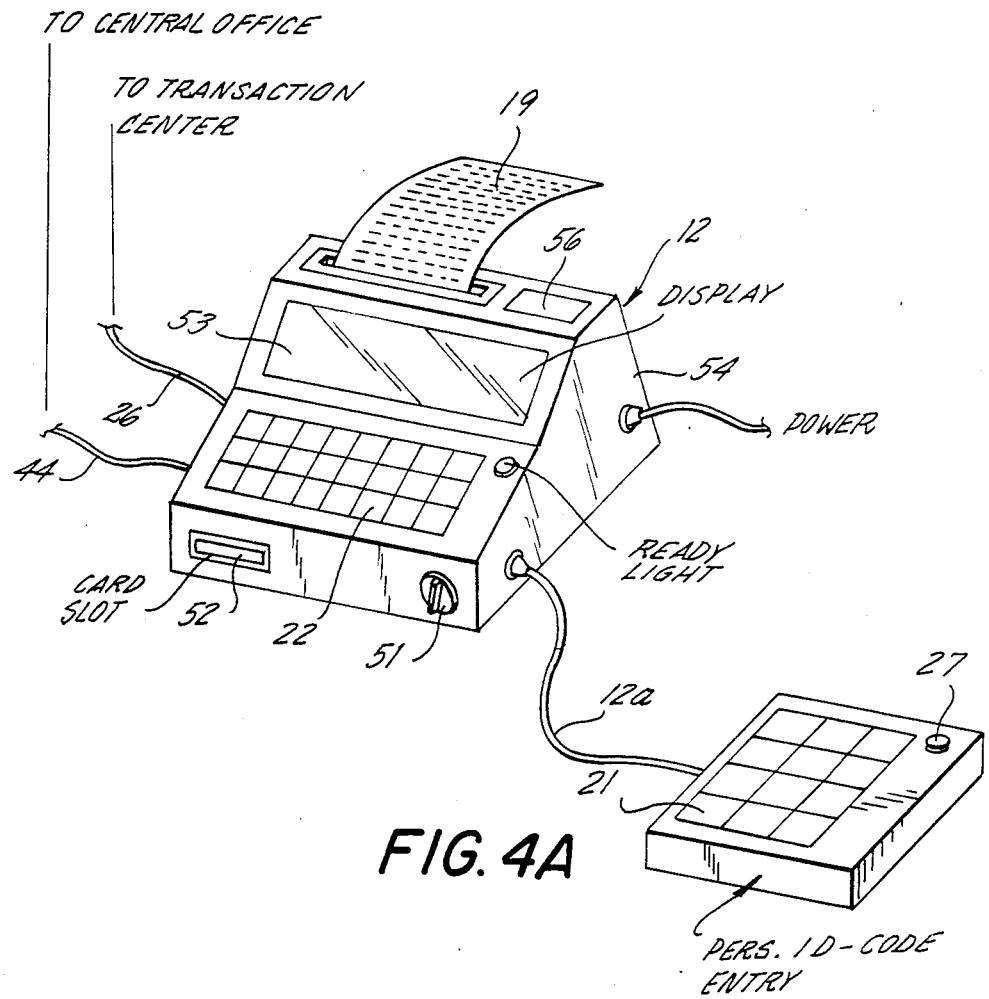
FIGS. 4a and 4b are perspective views of a typical transaction terminal with keyboard for transaction data, a display, a printer, and a keyboard for entry of personal ID code, a card slot and a space for inserting the encryption code key, and an encryption key.

FIG. 4A shows a typical card reader 12 shown in a perspective view. A housing 54 formed as a conventional console contains the card slot 52 for leading to an internal card reading mechanism for reading the machine-readable number on the card inserted into the slot. A keyboard 22 is the transaction input device for entering details such as cost, merchandise or service purchased, cost, date and so on. A display 53 repeats the data entered on a display screen. A built-in printer produces the abbreviated ticket 19 which contains only the transaction number, the name of the retail site and possibly a minimum of other information such as date and the merchant's name, address and telephone number.

The housing 54 advantageously also contains the computer 14 with memory 16, the encrypter 17 and the modem 24 shown in FIG. 1A. An opening 56 at the top or back of the housing 54 serves to receive the code key 23, FIG. 4B, for the encryption. These elements are all typically composed of electronic component and parts and fit readily together in a single housing 54 with a common on-off switch 51.

A separate keypad 21 with a ready light 27 is connected to the card reader 12 by a cord 12a or which may have a cordless connection using radio, infrared, acoustic or any other type connection, which may further be "scrambled" for added privacy, and serves to enter the card holder's PIN number.

The card reader 12 may further have connections to telephone lines or other data links, namely the data link 26 to the transaction center and the switched telephone line 44 to a central office for use for retail transactions conducted over a telephone.

Figure 4B:
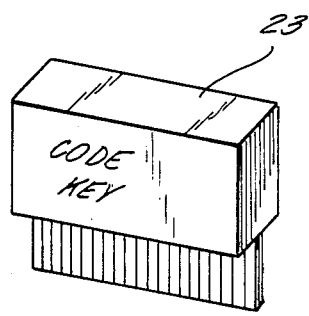

FIG. 4B shows a code key 23, which advantageously contains simply a small read-only memory for the encryption code, which can be inserted in the code key slot 56 and replaced whenever a new encryption code is desired.

FIGS. 2A, 2B and 2C show a typical transaction card 16 that is well suited for use in the transaction system, according to the invention. The card is advantageously a thin flexible plastic card, as seen in the edge view of FIG. 2A. It typically does not have raised letters for producing a carbon copy as do conventional credit or identification cards. On one side it has a magnetic stripe 61 that holds in magnetically imprinted characters or codes the account number of the cardholder. Another field 62 shows in clear letters the name of the card issuer or a common transaction center which is responsible for the administration of the card, and its name, address and telephone number may also be shown in this field. If several card issuers jointly participate as associate card issuers, their names and/or logos may show in the fields 63. FIG. 2C shows the reverse side of the card which may show, in the field 69, the name of the card holder, and a field 67 may show his written signature. A third field 68 may show instructions and conditions for the card user.

Figure 3:
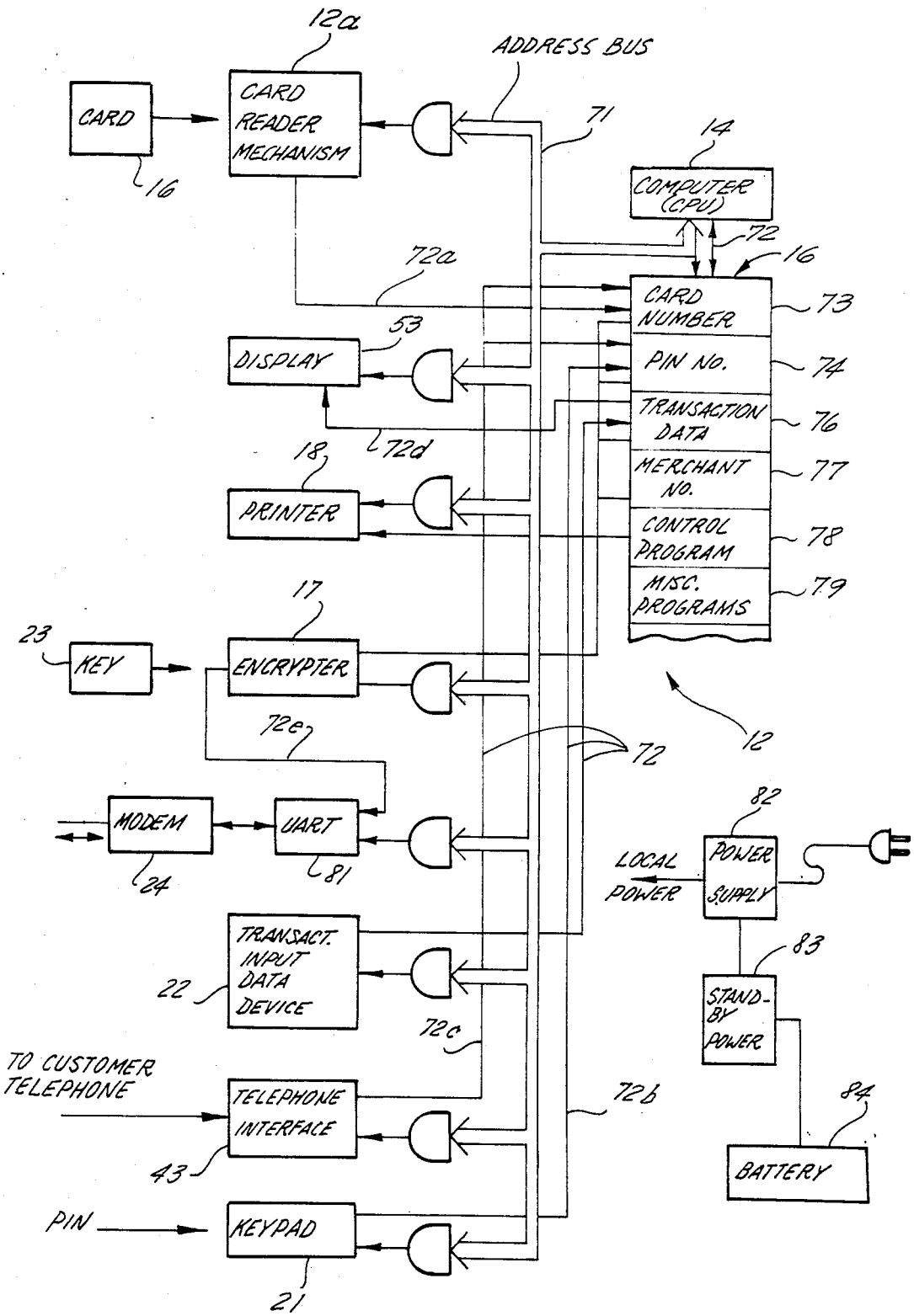
FIG. 3 is a block diagram which shows details of the circuit of the transaction terminal including the microcomputer with memory, a buffer memory, printer, display and keyboards.

FIG. 3 shows in block diagram the main elements of a card reader seen in perspective view in FIG. 4A. The elements shown in FIG. 3 are essentially electronic components that perform all the functions of the card reader 12.

The main control component is a computer 14 which contains a central processing unit (CPU) of a suitable type such as an Intel 8080 or any other suitable type. The computer 14 is connected with the individual elements via an address bus 71, which is a conventional multi-wire bus that can address any part of the system. A number of data busses 72 interconnect the various elements and transmit and receive data and instructions between the elements. Typically, the data bus is also a single multiwire bus, but is drawn as multiple single lines in order to better show the data flow as described herebelow.

The computer 14 is connected via the address bus 71 and a data bus 72 to a data memory 16 which is a conventional, typically solid-state computer memory divided into various sectors for string in binary encoded form various types of information.

The sector 78 holds the control programs that govern all the control functions of the card reader 12, substantially as described in the flow charts 5 and 6. The sector 73 serves to receive and temporarily store the card number, as it is read from the card reader mechanism 1 via the data line 72. The sector 74 stores the PIN number as it is entered by the cardholder on the keypad 21 via data line 72b. The transaction data sector 76 stores the transaction data such as type of merchandise, cost, date and so forth as they are entered on the transaction input data device 22 via data bus 72c. The sector merchant No. 77 stores the merchant number which may be entered at the input data device or entered automatically by some suitable built-in data device. The sector 78 which contains controls was described hereinabove. The miscellanous programs sector 79 contains a multitude of programs and data used for so-called "housekeeping" chores, function monitor programs and so forth.

After the completion of a transaction, and all its data have been transmitted to the transaction center, all transaction data, including the PIN are erased, to insure that it is kept secret.

The contents of the memory 16 is called software, and may be permanently stored in read-only ROM's or EROM's, while ther data may be transient data, stored in random access memory (RAM).

Other parts of the card reader may be so-called hardware, namely the display 53, which receives the transaction data via data bus 72d from the transaction data sector 76, the printer 18 which prints the transaction ticket and the retail establishment name and the transaction number and optionally the date as received from the control program sector 78 or a separate sector assigned to that function. The encrypter 17 converts all data to be sent to the transaction center to encrypted code as explained hereinabove and retransmits the encrypted code via data bus 72e to a component generally known as a universal asynchronous receivertransmitter 81 (UART) that converts the encrypted data into serial, machine-sendable data form, which is, in turn sent to the modem 24 that converts the data to data especially modulated and conditioned for data line transmission. The transaction input data device 22 is typically a keyboard. The telephone interface 43 serves to receive the data sent from the remote telephone of a customer who wishes to perform a retail transaction from a touchtone telephone. The telephone interface 43 essentially is a tone receiver for selectively receiving the particular frequencies transmitted from the touch-tone telephone, generally known as dual-tone multifrequency signals (DTMF) which is a well known, worldwide accepted signalling standard. The telephone interface typically retransmits the received signals as binary encoded data on the data line 72C to the card number sector 73 and the PIN No. sector 74.

Other hardware elements and the encrypting key 23 for controlling the encrypter 17, and a power supply 82 which may also include a stand-by power supply 83 and a battery 84 for supplying power under main power failure conditions.

Figure 5:
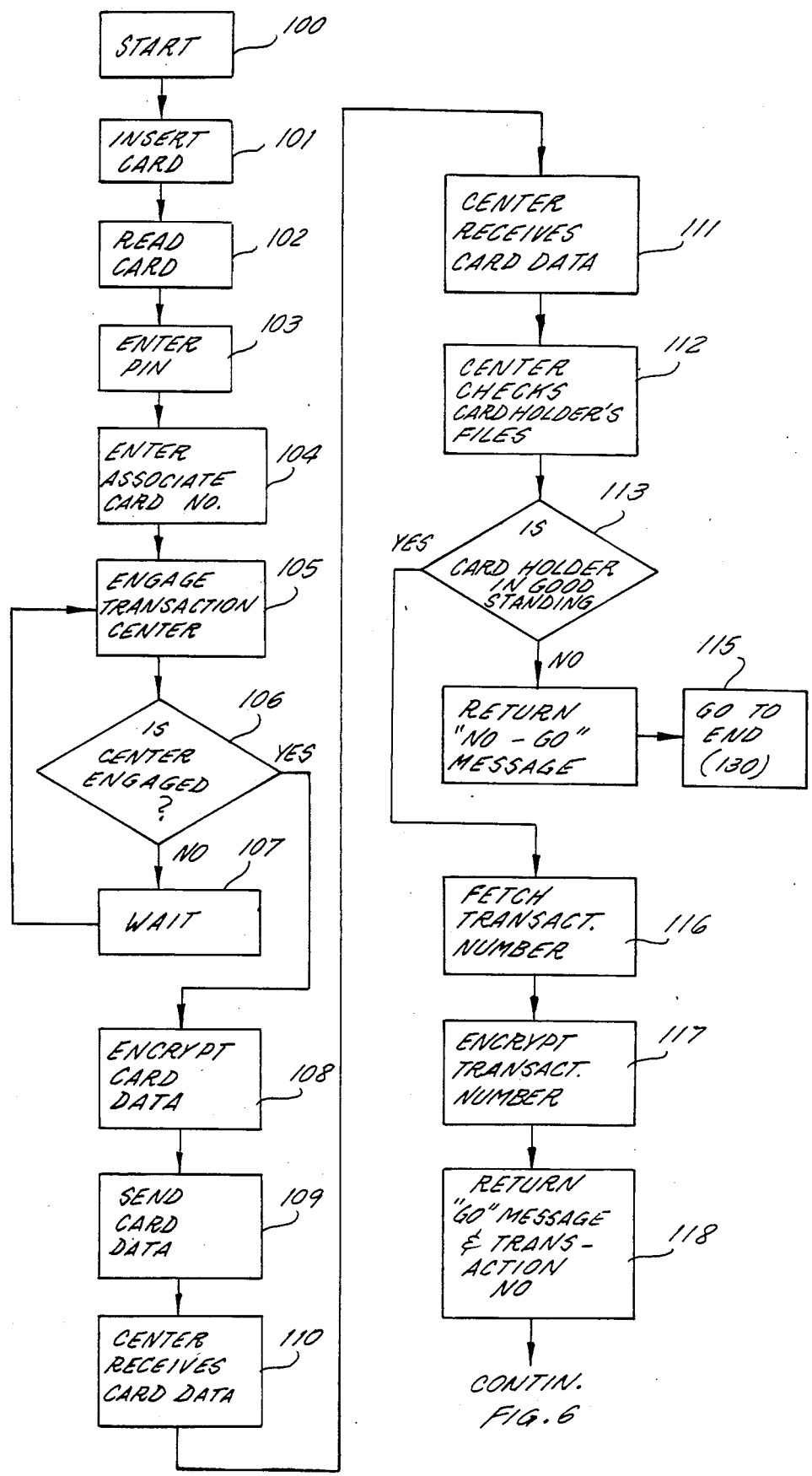
FIGS. 5 and 6 are a flowchart showing in step-by-step form the steps of a complete transaction, which form a basis for development of the control programs in the transaction terminal and in the transaction center.
Figure 6:
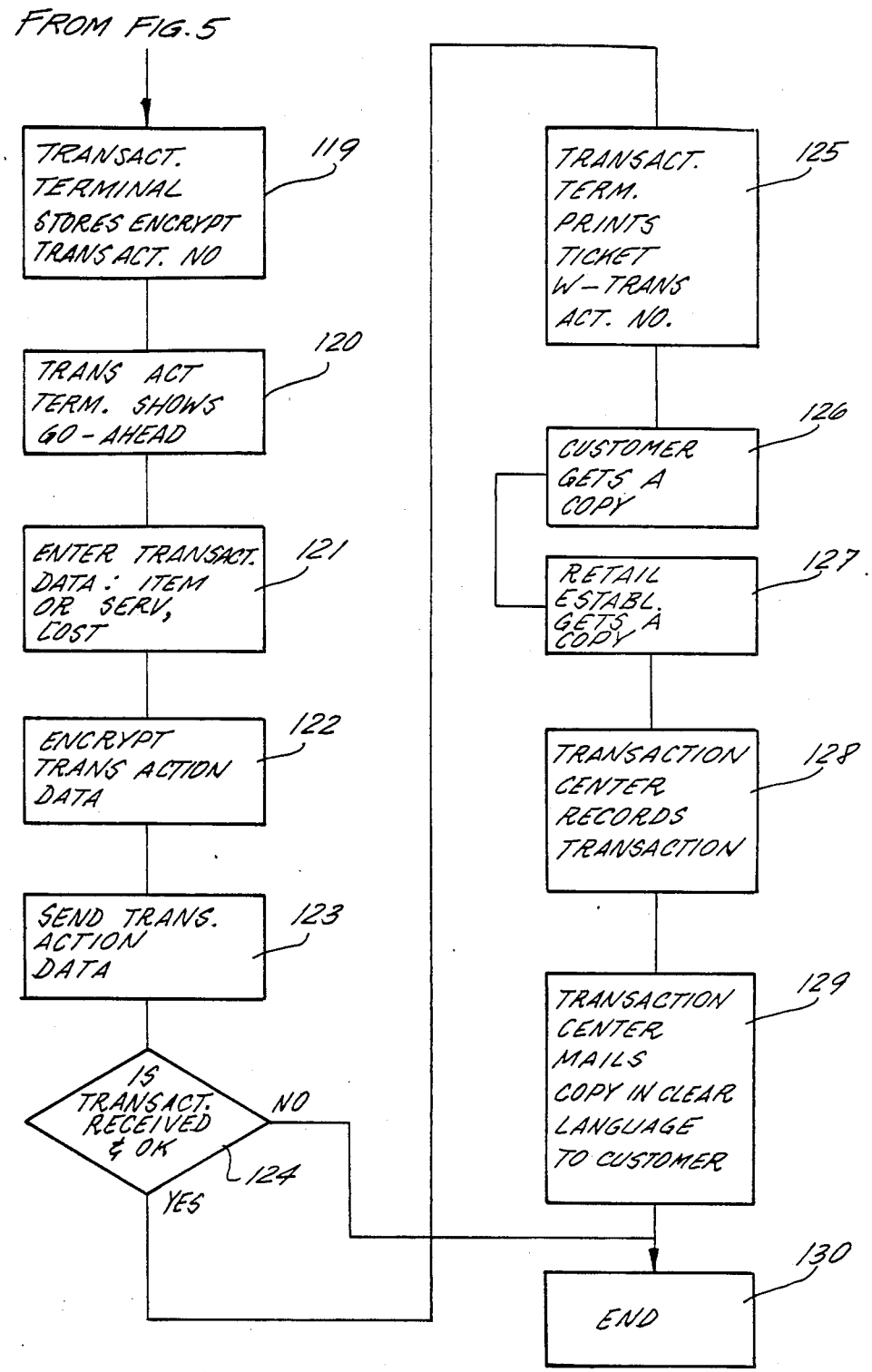

FIGS. 5 and 6 describe, in flow-chart form, the step-by-step progression of a transaction.

At Start 100, a card is inserted, and read in steps 101 and 102 and stored in the card reader computer memory. Next the customer enters his PIN number, and if applicable the code for the particular associate card-issuer he wishes to deal with in steps 103 and 104. Next, the card reader automatically engages the transaction center via the data line 26 and seeks to connect with the center in a so-called "hand-shake" procedure shown in FIG. 7A. Establishing connection with the transaction center takes place in steps 105, the decision step 106 which decides if the center is available for transaction, and possibly a Wait step 107, if the Center is not available. After the center is engaged, an optional data encryption step 108 is performed and the data are sent and received by the center in steps 109 and 110. At the center, if encrypted, the data are first deciphered in step 111 and the center computer scans the customer's file at the center to check if he is in good standing, in step 113. If he is not, a "No-go" message is sent to the retail site in step 114 and the process comes to a halt in steps 115 and 130 (End). If the cardholder is in good standing a transaction number is fetched from the transaction number generator 36 in step 116, and, if applicable, encrypted and sent with approval to the transaction site in steps 117 and 118. The transaction number is next temporarily stored in the transaction terminal and the go-ahead signal is signalled by the terminal in steps 119 and 120 (FIG. 6). The transaction can now proceed and the transaction data are entered at the terminal, possibly encrypted there, and sent to the transaction center in steps 121, 122 and 123. A data check for validity of the data such as a parity check may be performed at the center in step 124, and retransmitted back to the terminal for verification. If the data are validated, the transaction terminal prints a transaction ticket with limited information, namely, the retail site name, the transaction number and the date in step 125. The customer gets a copy and the retail center retains a copy as a record of the transaction, as shown in steps 126 and 127. At the transaction center the entire transaction is recorded in the customer's file 33, and the customer's account is debited for the amount of the transaction in step 128. Next at the transaction center, advantageously at the end of a billing period, a statement is sent to the customer and to the retail center. The statements can be sent to designated persons at the retail center, so that the transaction is not generally reported to personnel who have no need to be informed thereof. Thereby, additional protection of the card-holder's account number and transaction data are attained.

FIGS. 7A-D show details of the transmitted data format. FIG. 7A is the "handshake" procedure preceding the firm engagement between the transaction site computer and the transaction center computer. FIG. 7B shows the data format transmitted from the transaction site to the transaction center, consisting of the card number, the transaction data, the merchant or transaction site identity, and the card type, indicating which associate card-issuer the customer selects to use. FIG. 7C shows the data returned from the transaction center, consisting of the transaction number, transaction approval and the transaction data returned for verification only. FIG. 7D is a final verification process in which both computers perform a final comparison of data to assure conformance of data at both ends of the transaction, which it again sent back to retain correlation (with the transaction center's.)

The integrity of the card system disclosed hereinabove can be further improved by adding additional personal identifying information data to the card, such as the signature, voice print or a thumb-print to be shown on the card. With uses of existing technology, such data can be converted to digital form and stored, using high density data storage such as holographic or similar state-of-the-art memory on the card, and read by an appropriately equipped card reader for comparison with corresponding data contained in the cardholder's file at the transaction center.

The use of a common transaction center has the advantage that lost or stolen cards can be quickly voided by a simple telephone call from anywhere to the transaction center. Also, faked and counterfeit cards using invalid, non-recorded card numbers can be quickly detected, since such a number would have no corresponding PIN-number. Such cards can be quickly voided and/or reinstated using widely distributed networks, such as are now coming into existence.

In providing the data link between the transaction center and the transaction site, it is to be understood that the data transmitting medium may be any suitable data transmission means, including dedicated or switched, dial-up data lines, voiceband channels that may be switched or dedicated, optic fiber or microwave channels and so forth.

The transaction card, as described hereinabove can be used, as described, for a credit card or a personal identification card, and can have further utility as a for example, a medical IDcard for admission to medical facilities, and may include medical information and history about the cardholder in the machinereadable field 61, FIG. 2B, which may be printed out by the printer 18 fo the card reader 12, after the identity of the cardholder has been verified at the transaction center. In this application, medical centers, hospitals, even ambulances with medical personnel may be equipped with a card reader of the type described hereinabove, using the vehicle's two-way radio as a data link to the transaction center.

For further securing the security of the system, both the card reader 12 with its associated components, and the transaction center 11 may have stand-by power supply systems, shown as a power supply 82, a stand-by power unit 83 and a battery 84, seen in FIG. 3.

For further enhancement of the utility of the card system, each card reader may have capability for automatic dialing the connection to the transaction center.

I claim:

1. A financial and identification card transaction system for protecting transactions between a plurality of cardholders, each having a card, with a machine-readable code imprinted thereon and a card-issuing organization via at least one transaction site connected by a data channel with a remote transaction center, the system which comprises:

a card reader disposed at the transaction site for reading the machine-readable code imprinted on the card, the machine readable code including a cardholder code that is unique to each cardholder;

a transaction number that uniquely identifies each transaction;

a transaction number store included with the card reader for receiving and storing the transaction number from the transaction center;

a transaction data input device connected to the card reader for receiving transaction data;

a printer connected to the card reader for printing a transaction ticket which includes the transaction number;

a center computer disposed at the transaction center having memory for storing transaction data received from the card reader via the data channel;

a transaction number generator included with the center computer for generating the transaction number.

2. A card transaction system according to claim 1 wherein said card reader further comprises a keyboard for receiving a personal identification number (PIN) that combined with the machine-readable code, uniquely identifies each card-holder.

3. A card transaction system according to claim 1 wherein said transaction ticket has a number printed thereon which consists essentially of the transaction number.

4. A card transaction system according to claim 3 wherein said number printed on the transaction ticket further comprises the date of the transaction.

5. A card transaction system according to claim 4 wherein said transaction ticket comprises two copies, of which one is given to the cardholder as a record of the transaction, and one is filed at the transaction site.

6. A card transaction system according to claim 5 which further comprises:

a microcomputer having a memory for storing a control program for controlling the card reader.

7. A transaction system according to claim 6 further comprising a modem for receiving and transmitting data transmitted on said data channel between said card reader and said transaction center.

8. A card transaction system according to claim 7 further comprising an encrypter connected to the card reader for encrypting data transmitted form the card reader to the transaction center and for deciphering data received from the transaction center; and an encryption algorithm stored in said center computer for deciphering data received from said card reader and for encrypting data transmitted to said card reader.

9. A card transaction system according to claim 8 comprising a code key, which includes a plug-in read-only memory inserted into said encrypter.

10. A card transaction system according to claim 1 further comprising a telephone interface connected to an incoming telephone line for receiving the personal identification number and the cardholder code from a remote telephone disposed at a remote location.

11. A card transaction system according to claim 1 wherein said transaction center comprises a transaction center interface connected to said center computer and a modem disposed in the connection between the transaction center interface and the data channel, the transaction center interface operating to convert digital parallel data in the computer to serial digital data in the data channel.

12. A card transaction system according to claim 1 further comprising:

a center computer memory;

a control program included in the center computer memory for controlling the transaction center interface;

a cardholder file memory included in the center computer memory for containing cardholder records.

13. A card transaction system according to claim 12 comprising at least one further data channel for data communication between the transaction center and at least one participating card-issuers data files for interchanging of cardholder related data.

14. A card transaction system according to claim 13 comprising at least one center printer for printing a complete transaction record for each transaction, the transaction record which includes all transaction data, the transaction number and the cardholders code, the transaction record for transmittal to the cardholder and to the retail site.

15. A card transaction system according to claim 14 comprising a computer terminal connected to said center computer, the terminal which includes a display and a keyboard for interactively communicating with the cardholder's records and the encryption algorithm.

16. A card transaction system according to claim 1 wherein said data channel may be a fixed dedicated data channel.

17. A card transaction system according to claim 1 wherein said data channel may be a switched data channel.

18. A card transaction system according to claim 1 wherein said data channel may be a digital data channel.

19. A card transaction system according to claim 1 further comprising a stand-by power supply connected to the card reader for supplying stand-by power during main power failure.

20. A card transaction system according to claim 1 further comprising a stand-by power supply connected to the transaction center for supplying stand-by power during main power failure.

21. A card transaction system according to claim 1 further comprising medical data for the card holder, included in the machine-readable card.

22. A card transaction system according to claim 1 further comprising data links from the transaction center to associate card-issuer's data centers for further verification of data.

23. A card transaction system according to claim 1 further comprising personal identifying data related to the cardholder.

24. A card transaction system according to claim 23 wherein said personal identifying data include finger prints.

25. A card transaction system according to claim 23 wherein said personal identifying data include facial image data.

26. A card transaction system according to claim 23 wherein said personal identifying data include voice print data.

* * * * *

(12) EX PARTE REEXAMINATION CERTIFICATE (5832nd)
United States Patent
Ware

(10) Number: US 4,707,592 C1
(45) Certificate Issued: Jul. 31, 2007

(54) PERSONAL UNIVERSAL IDENTITY CARD SYSTEM FOR FAILSAFE INTERACTIVE FINANCIAL TRANSACTIONS

(75) Inventor: Paul N. Ware, Summerville, FL (US)

(73) Assignee: Techsearch, LLC, Northbrook, IL (US)

Reexamination Request:
No. 90/007,543, May 16, 2005
No. 90/007,716, Sep. 13, 2005

Reexamination Certificate for:
Patent No.: 4,707,592
Issued: Nov. 17, 1987
Appl. No.: 06/784,954
Filed: Oct. 7, 1985

(51) Int. Cl.
*G07D 11/00* (2006.01)

(52) U.S. Cl. .......................... 235/379; 235/380
(58) Field of Classification Search .................. 235/379, 235/380
See application file for complete search history.

(56) References Cited

U.S. PATENT DOCUMENTS

| | | |
|---|---|---|
| 3,106,612 A | 10/1963 | Lemelson |
| 3,434,130 A | 3/1969 | Lemelson |
| 3,511,940 A | 5/1970 | Lemelson |
| 3,594,727 A | 7/1971 | Braun |
| 3,597,734 A | 8/1971 | Harris, Jr. |
| 3,631,395 A | 12/1971 | Zucker et al. |
| 3,636,315 A | 1/1972 | Comeau |
| 3,652,795 A | 3/1972 | Wolf et al. |
| 3,671,722 A | 6/1972 | Christie |
| 3,686,637 A | 8/1972 | Zachar et al. |
| 3,696,335 A | 10/1972 | Lemelson |
| 3,702,392 A | 11/1972 | St. Jean |
| 3,704,890 A | 12/1972 | Zucker et al. |
| 3,718,764 A | 2/1973 | Deschenes et al. |
| 3,719,927 A | 3/1973 | Michels et al. |
| 3,723,655 A | 3/1973 | Zucker et al. |
| 3,731,076 A | 5/1973 | Nagata et al. |
| 3,793,624 A | 2/1974 | Vaskunas et al. |
| 3,921,318 A | 11/1975 | Calavetta |
| 3,931,497 A | 1/1976 | Gentile et al. |
| 3,931,614 A | 1/1976 | Vasa et al. |
| 3,956,615 A | 5/1976 | Anderson et al. |
| 3,970,992 A | 7/1976 | Boothroyd et al. |
| 3,973,237 A | 8/1976 | Sawaguchi et al. |
| 4,034,193 A | 7/1977 | Jackson |
| 4,048,475 A | 9/1977 | Yoshida |
| 4,085,313 A | 4/1978 | Van Ness |
| 4,114,027 A | 9/1978 | Slater et al. |

(Continued)

FOREIGN PATENT DOCUMENTS

GB 2130412 5/1984

OTHER PUBLICATIONS

"NCR POS Interface Technology for CCF", 1964 by NCR Corporation, pp. i and 1, 3, 5–9, 11, 13–19 and 21–39.

(Continued)

*Primary Examiner*—Kwang B. Yao

(57) ABSTRACT

A financial card transaction system for protecting the financial transactions against fraud, by reducing the dissemination of the cardholder's account code and the transaction data. The system includes a plurality of retail sales, each having a card reader that is connected by data channels to a transaction center with a computer that includes cardholder's records and a transaction number generator. The transaction number uniquely identifies each transaction undertaken within a given time frame and is the only number printed out on a transaction ticket at the retail site, while transaction data, such as cost, type of merchandise, cardholder's account number, etc. are not printed out at the retail site, but only at the transaction center where it is included in the monthly or quarterly statement printed by the computer and sent to both cardholder and retail site. Encryption may be included in order to prevent the unauthorized monitoring of the data flow. A telephone interface may be provided at the retail site so that a cardholder may call and send his account number and personal identity number from a push button telephone.

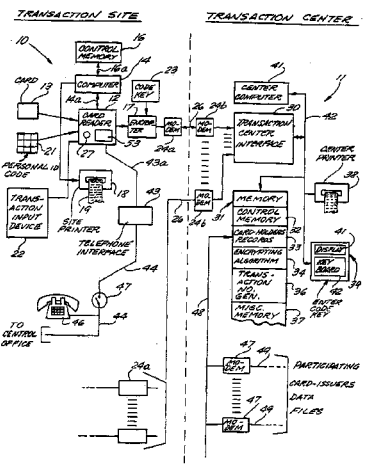

U.S. PATENT DOCUMENTS

| | | | |
|---|---|---|---|
| 4,123,747 | A | 10/1978 | Lancto et al. |
| 4,186,871 | A | 2/1980 | Anderson et al. |
| 4,199,100 | A | 4/1980 | Wostl et al. |
| 4,295,039 | A | 10/1981 | Stuckert |
| 4,297,569 | A | 10/1981 | Flies |
| 4,300,042 | A | 11/1981 | Oldenkamp et al. |
| 4,315,101 | A | 2/1982 | Atalla |
| 4,318,554 | A | 3/1982 | Anderson |
| 4,319,336 | A | 3/1982 | Anderson et al. |
| 4,321,672 | A | 3/1982 | Braun et al. |
| 4,355,369 | A | 10/1982 | Garvin |
| 4,385,384 | A * | 5/1983 | Rosbury et al. ............ 714/717 |
| 4,386,266 | A | 5/1983 | Chesarek |
| 4,405,856 | A | 9/1983 | Poisson |
| 4,423,287 | A | 12/1983 | Zeidler |
| 4,423,316 | A | 12/1983 | Sano |
| 4,438,824 | A | 3/1984 | Mueller-Schloer |
| 4,439,636 | A | 3/1984 | Newkirk et al. |
| 4,449,189 | A | 5/1984 | Feix et al. |
| 4,460,960 | A | 7/1984 | Anderson et al. |
| 4,472,626 | A | 9/1984 | Frid |
| 4,473,756 | A | 9/1984 | Brigden et al. |
| 4,511,970 | A | 4/1985 | Okano et al. |
| 4,513,375 | A | 4/1985 | Bruce |
| 4,532,416 | A | 7/1985 | Berstein |
| 4,542,287 | A | 9/1985 | Watanabe |
| 4,544,833 | A | 10/1985 | Ugon |
| 4,630,200 | A | 12/1986 | Ohmae et al. |
| 4,630,201 | A | 12/1986 | White |
| 4,673,802 | A | 6/1987 | Ohmae et al. |
| 4,692,600 | A | 9/1987 | Takahashi |
| 4,727,243 | A | 2/1988 | Savar |
| 4,747,049 | A | 5/1988 | Richardson et al. |
| 4,757,543 | A | 7/1988 | Tamada et al. |

OTHER PUBLICATIONS

Phillips Petroleum Company Annual Report 1983, 2 pages including p. 21.

Marketer Periodical "Selling 66", 1983, 3 pages, including pp. 27 and 28.

Plaintiffs' Opening Claim Construction Brief submitted in *Paul N. Ware et al. v. Gap, Inc. et al.*, C.A. No. 4–04–CV–065 RLV in the United States District Court for the Northern District of Georgia Rome Division.

Plaintiffs' Response To Defendants' Opening Claim Construction Brief submitted in *Paul N. Ware et al. v. Gap, Inc. et al.*, C.A. No. 4–04–CV–065 RLV in the United States District Court for the Northern District of Georgia Rome Division.

Racetac's Opening Brief In Support Of Claim Construction submitted in *Paul N. Ware et al. v. Gap, Inc. et al.*, C.A. No. 4–04–CV–065 RLV in the United States District Court for the Northern District of Georgia Rome Division.

Defendants Eckerd, JC Penney, And Kroger's Opening Claim Construction Brief submitted in *Paul N. Ware et al. v. Gap, Inc. et al.*, C.A. No. 4–04–CV–065 RLV in the United States District Court for the Northern District of Georgia Rome Division.

Defendants Eckerd, JC Penney, And Kroger's Claim Construction Response Brief submitted in *Paul N. Ware et al. v. Gap, Inc. et al.*, C.A. No. 4–04–CV–065 RLV in the United States District Court for the Northern District of Georgia Rome Division.

Defendants Eckerd, JC Penney, and Kroger's Proposed Construction of Claim Terms submitted in *Paul N. Ware et al. v. Gap, Inc. et al.*, C.A. No. 4–04–CV–065 HLM in the United States District Court for the Northern District of Georgia Rome Division.

Defendants Racetrac Petroleum Inc.'s Definitions of Claim Terms submitted in *Paul N. Ware et al. v. Gap, Inc. et al.*, C.A. No. 4–04–CV–065 HLM in the United States District Court for the Northern District of Georgia Rome Division.

Letter dated Jun. 29, 2005 from Seed IP.

Letter dated Apr. 11, 2005 from Seed IP.

Affidavit of Jan Walsh dated.

Letter dated Sep. 7, 2004 from Friedman, Suder and Cook.

Letter dated Aug. 20, 2004 from Friedman, Suder and Cook.

Letter dated Sep. 17, 2003 from Friedman, Suder and Cook.

Letter dated Mar. 15, 2005 from Acacia Technologies Group.

Letter dated Jun. 2, 2005 from Crowe & Dunlevy.

IBM 3680 Programmable Store System Operator's Guide, Second Edition (May 1980), 266 pages labeled IBM 000001–IBM 000265.

IBM 3680 Programmable Store System: Supermarket Environment: User's Guide, First Edition (Match 1982), 364 pages labeled IBM 000266–IBM 000629.

IBM 3680 Programmable Store System Retail Environment User's Guide, First Edition (Nov. 1982), 267 pages labeled IBM 000630–IBM 000896.

IBM 3680 Programmable Store System Retail Environment Program Reference and Operations Guide, First Edition (Nov. 1982), 400 pages labeled IBM 000897–IBM 001296.

IBM 3680 Programmable Store System Retail Environment General Information, First Edition (Oct. 1982), 84 pages labeled IBM 001297–IBM 001380.

IBM 3680 Programmable Store System: Supermarket Environment: Program Reference and Operations Guide, First Edition (Mar. 1982), 297 pages labeled IBM 001381–IBM 001677.

IBM 3680 Programmable Store System: Supermarket Environment: General Information Manual, Second Edition (Mar. 1982), 76 pages labeled IBM 001678–IBM 001753.

JC Penney Internal Correspondence, entitled "NCR POS 2950 Geographic Hard Disk System Rollout" (Nov. 18, 1983), 34 pages labeled JCP 000581–JCP 000614.

The American Heritage Dictionary of the English Language, Fourth Edition, 2000, pp. 463, 1806 and 1975.

Random House Webster's Unabridged Dictionary, Second Edition, 2001, pp. 335, 508, 796, 950, 967 and 1128.

Merriam–Webster's Collegiate Dictionary, Eleventh Edition, 2003, 361, 521, 1327, 1166, 1368 and 1369.

The American Heritage College Thesaurus, First Edition, 2004, p. 824.

Microsoft Press Computer Dictionary, 1991, p. 297.

Webster's Third New International Dictionary of the English Language Unabridged, 1981, pp. 362, 363, 1143, 1921, 2128, 2129 and 2500.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 is confirmed.

* * * * *

US004707592C2

(12) EX PARTE REEXAMINATION CERTIFICATE (6939th)

United States Patent
Ware

(10) Number: US 4,707,592 C2
(45) Certificate Issued: Jul. 14, 2009

(54) PERSONAL UNIVERSAL IDENTITY CARD SYSTEM FOR FAILSAFE INTERACTIVE FINANCIAL TRANSACTIONS

(75) Inventor: Paul N. Ware, Summerville, FL (US)

(73) Assignee: Financial Systems Innovation, LLC, Newport Beach, CA (US)

Reexamination Request:
No. 90/008,565, Apr. 24, 2007
No. 90/008,641, May 17, 2007

Reexamination Certificate for:
Patent No.: 4,707,592
Issued: Nov. 17, 1987
Appl. No.: 06/784,954
Filed: Oct. 7, 1985

Reexamination Certificate C1 4,707,592 issued Jul. 31, 2007

(51) Int. Cl.
G07F 7/08 (2006.01)
G07F 7/10 (2006.01)

(52) U.S. Cl. ............ 235/379; 235/380; 379/91.01; 379/93.02; 705/64; 713/185; 902/22
(58) Field of Classification Search .............. None
See application file for complete search history.

(56) References Cited

U.S. PATENT DOCUMENTS

| 3,082,402 | A | 3/1963 | Scantlin |
| 3,106,612 | A | 10/1963 | Lemelson |
| 3,434,130 | A | 3/1966 | Lemelson |
| 3,511,940 | A | 5/1970 | Lemelson |
| 3,594,727 | A | 7/1971 | Braun |
| 3,597,734 | A | 8/1971 | Harris, Jr. |
| 3,631,395 | A | 12/1971 | Zucker et al. |
| 3,636,315 | A | 1/1972 | Comeau |
| 3,648,021 | A | 3/1972 | Rogers |
| 3,652,795 | A | 3/1972 | Wolf et al. |
| 3,655,946 | A | 4/1972 | Morita et al. |
| 3,671,722 | A | 6/1972 | Christie |
| 3,686,637 | A | 8/1972 | Zachar et al. |
| 3,696,335 | A | 10/1972 | Lemelson |
| 3,702,392 | A | 11/1972 | St. Jean |
| 3,704,890 | A | 12/1972 | Zucker et al. |
| 3,718,764 | A | 2/1973 | Deschenes et al. |
| 3,719,927 | A | 3/1973 | Michels et al. |
| 3,723,655 | A | 3/1973 | Zucker et al. |
| 3,727,186 | A | 4/1973 | Stephenson |
| 3,731,076 | A | 5/1973 | Nagata et al. |
| 3,793,624 | A | 2/1974 | Vaskunas et al. |

(Continued)

FOREIGN PATENT DOCUMENTS

| EP | 0107865 | 9/1984 |
| GB | 2130412 | 5/1984 |
| JP | 5979375 | 5/1984 |

OTHER PUBLICATIONS

"NCR POS Interface Technology for CCF", 1964 by NCR Corporation, pp. i and 1, 3, 5–9, 11, 13–19 and 21–39.

(Continued)

Primary Examiner—James Menefee

(57) ABSTRACT

A financial card transaction system for protecting the financial transactions against fraud, by reducing the dissemination of the cardholder's account code and the transaction data. The system includes a plurality of retail sales, each having a card reader that is connected by data channels to a transaction center with a computer that includes cardholder's records and a transaction number generator. The transaction number uniquely identifies each transaction undertaken within a given time frame and is the only number printed out on a transaction ticket at the retail site, while transaction data, such as cost, type of merchandise, cardholder's account number, etc. are not printed out at the retail site, but only at the transaction center where it is included in the monthly or quarterly statement printed by the computer and sent to both cardholder and retail site. Encryption may be included in order to prevent the unauthorized monitoring of the data flow. A telephone interface may be provided at the retail site so that a cardholder may call and send his account number and personal identity number from a push button telephone.

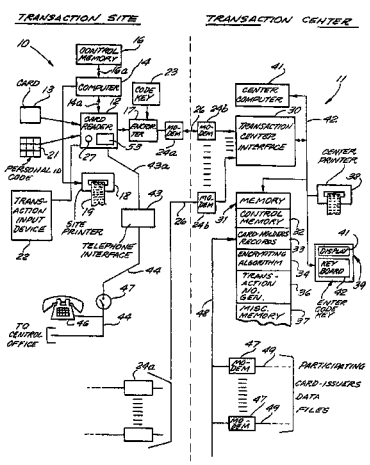

U.S. PATENT DOCUMENTS

| | | |
|---|---|---|
| 3,794,813 A | 2/1974 | Spetz |
| 3,868,057 A | 2/1975 | Chavez |
| 3,921,318 A | 11/1975 | Calavetta |
| 3,931,497 A | 1/1976 | Gentile et al. |
| 3,931,614 A | 1/1976 | Vasa et al. |
| 3,956,615 A | 5/1976 | Anderson et al. |
| 3,970,992 A | 7/1976 | Boothroyd et al. |
| 3,973,237 A | 8/1976 | Sawaguchi et al. |
| 3,982,103 A | 9/1976 | Goldman |
| 4,034,193 A | 7/1977 | Jackson |
| 4,035,623 A | 7/1977 | Eastell et al. |
| 4,048,475 A | 9/1977 | Yoshida |
| 4,085,313 A | 4/1978 | Van Ness |
| 4,114,027 A | 9/1978 | Slater et al. |
| 4,123,747 A | 10/1978 | Lancto et al. |
| 4,136,819 A | 1/1979 | Torita et al. |
| 4,186,871 A | 2/1980 | Anderson et al. |
| 4,199,100 A | 4/1980 | Wostl et al. |
| 4,228,348 A | 10/1980 | Lee |
| 4,295,039 A | 10/1981 | Stuckert |
| 4,297,569 A | 10/1981 | Flies |
| 4,300,042 A | 11/1981 | Oldenkamp et al. |
| 4,315,101 A | 2/1982 | Atalla |
| 4,318,554 A | 3/1982 | Anderson |
| 4,319,336 A | 3/1982 | Anderson et al. |
| 4,321,672 A | 3/1982 | Braun et al. |
| 4,322,612 A | 3/1982 | Lange |
| 4,355,369 A | 10/1982 | Garvin |
| 4,385,384 A | 5/1983 | Rosbury |
| 4,386,266 A | 5/1983 | Chesarek |
| 4,405,856 A | 9/1983 | Poisson |
| 4,423,287 A | 12/1983 | Zeidler |
| 4,423,316 A | 12/1983 | Sano |
| 4,438,824 A | 3/1984 | Mueller-Schloer |
| 4,439,636 A | 3/1984 | Newkirk et al. |
| 4,449,189 A | 5/1984 | Feix et al. |
| 4,460,960 A | 7/1984 | Anderson et al. |
| 4,472,626 A | 9/1984 | Frid |
| 4,473,756 A | 9/1984 | Brigden et al. |
| 4,511,970 A | 4/1985 | Okano et al. |
| 4,513,375 A | 4/1985 | Bruce |
| 4,532,416 A | 7/1985 | Berstein |
| 4,542,287 A | 9/1985 | Watanabe |
| 4,544,833 A | 10/1985 | Ugon |
| 4,630,200 A | 12/1986 | Ohmae et al. |
| 4,630,201 A | 12/1986 | White |
| 4,673,802 A | 6/1987 | Ohmae et al. |
| 4,692,600 A | 9/1987 | Takahashi |
| 4,727,243 A | 2/1988 | Savar |
| 4,747,049 A | 5/1988 | Richardson et al. |
| 4,757,543 A | 7/1988 | Tamada et al. |

OTHER PUBLICATIONS

Phillips Petroleum Company Annual Report 1983, 2 pages including p. 21.

Marketer Periodical "Selling 66", 1983, 3 pages, including pp. 27 and 28.

Plaintiffs' Opening Claim Construction Brief submitted in *Paul N. Ware et al. v. Gap, Inc. et al.*, C.A. No. 4–04–CV–065 RLV in the United States District Court for the Northern District of Georgia Rome Division.

Plaintiffs' Response To Defendants' Opening Claim Construction Brief submitted in *Paul N. Ware et al. v. Gap, Inc. et al.*, C.A. No. 4–04–CV–065 RLV in the United States District Court for the Northern District of Georgia Rome Division.

Letter dated Jun. 29, 2005 from Seed IP.

Letter dated Apr. 11, 2005 from Seed IP.

Affidavit of Jan Walsh dated.

Letter dated Sep. 7, 2004 from Friedman, Suder and Cook.

Letter dated Aug. 20, 2004 from Friedman, Suder and Cook.

Letter dated Sep. 17, 2003 from Friedman, Suder and Cook.

Letter dated Mar. 15, 2005 from Acacia Technologies Group.

Letter dated Jun. 2, 2005 from Crowe & Dunlevy.

IBM 3680 Programmable Store System Operator's Guide, Second Edition (May 1980), 266 pages labeled IBM 000001–IBM 000265.

IBM 3680 Programmable Store System: Supermarket Environment: User's Guide, First Edition (Match 1982), 364 pages labeled IBM 000266–IBM 000629.

IBM 3680 Programmable Store System Retail Environment User's Guide, First Edition (Nov. 1982), 267 pages labeled IBM 000630 –IBM 000896.

IBM 3680 Programmable Store System Retail Environment Program Reference and Operations Guide, First Edition (Nov. 1982), 400 pages labeled IBM 000897 –IBM 001296.

IBM 3680 Programmable Store System Retail Environment General Information, First Edition (Oct. 1982), 84 pages labeled IBM 001297 –IBM 001380.

IBM 3680 Programmable Store System: Supermarket Environment: Program Reference and Operations Guide, First Edition (Mar. 1982), 297 pages labeled IBM 001381 –IBM 001677.

IBM 3680 Programmable Store System: Supermarket Environment: General Information Manual, Second Edition (Mar. 1982), 76 pages labeled IBM 001678 –IBM 001753.

JC Penney Internal Correspondence, entitled "NCR POS 2950 Geographic Hard Disk System Rollout" (Nov. 18, 1983), 34 pages labeled JCP 000581 –JCP 000614.

The American Heritage Dictionary of the English Language, Fourth Edition, 2000, pp. 463, 1806 and 1975.

Random House Webster's Unabridged Dictionary, Second Edition, 2001, pp. 335, 508, 796, 950, 967 and 1128.

Merriam–Webster's Collegiate Dictionary, Eleventh Edition, 2003, 361, 521, 1327, 1166, 1368 and 1369.

The American Heritage College Thesaurus, First Edition, 2004, p. 824.

Microsoft Press Computer Dictionary, 1991, p. 297.

Webster's Third New International Dictionary of the English Language Unabridged, 1981, pp. 362, 363, 1143, 1921, 2128, 2129 and 2500.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20, 22–26 is confirmed.

Claim 21 was not reexamined.

\* \* \* \* \*